United States Patent Office 2,738,353
Patented Mar. 13, 1956

2,738,353

PURIFICATION AND RECOVERY OF PYRROLIDONE CARBOXYLIC ACID

Morris J. Blish, Toledo, Ohio, assignor to International Minerals & Chemical Corporation, a corporation of New York No Drawing. Application November 24, 1951, Serial No. 258,085

8 Claims. (Cl. 260—326.3)

The present invention relates to a process for the recovery of substantially pure pyrrolidone carboxylic acid. More particularly, the instant invention relates to the purification of pyrrolidone carboxylic acid-containing mixtures by an ion exchange process.

Glutamic acid occurs as a constituent in hydrolysates of vegetable and animal proteins and of solutions resulting from the desugarization of sugar beet solutions by the Steffen process. These mixtures are complex and contain organic compounds such as amino acids, as well as organic acids, inorganic salts, and other compounds. Any glutamic acid present in these hydrolysates or in analogous mixtures can be converted to pyrrolidone carboxylic acid and separated from the other amino acids and impurities inherently present in the crude mixtures.

U. S. Patents Nos. 2,523,047 and 2,510,980 describe processes involving the subjecting of aqueous mixtures containing pyrrolidone carboxylic acid to ion exchange in order to recover pyrrolidone carboxylic acid from the mixture which is derived from sugar beet juice. The recoveries realized when employing these processes are somewhat limited, due to the impurities present in the crude aqueous mixtures and the manner in which the aqueous mixtures are treated with the ion exchange materials.

It is an object of the instant invention to provide a process for the recovery of pyrrolidone carboxylic acid which overcomes certain limitations and disadvantages of processes heretofore known.

It is a further object of the instant invention to provide a process for the purification of pyrrolidone carboxylic acid-containing mixtures.

It is a further object of the instant invention to provide a process for the purification and recovery of pyrrolidone carboxylic acid from proteinaceous compositions by ion exchange.

It is a further object of the instant invention to provide a process for the recovery of pyrrolidone carboxylic acid from mixtures containing pyrrolidone carboxylic acid, tyrosine, leucine, and sulfuric acid dissolved in an organic solvent.

These and other objects of the instant invention will become more apparent upon a fuller understanding of the process as herein described.

It has been discovered that purified pyrrolidone carboxylic acid is recovered from a mixture containing pyrrolidone carboxylic acid dissolved in an organic solvent by subjecting the mixture to treatment with an anion exchange material.

More specifically, it has been discovered that purified pyrrolidone carboxylic acid is recovered from crude mixtures containing it by extracting the pyrrolidone carboxylic acid present in the crude mixture with an organic solvent, selected from the group consisting of low boiling monohydric alcohols and low boiling aliphatic ketones, and subjecting the resulting solution containing pyrrolidone carboxylic acid dissolved in the organic solvent to anion exchange resin treatment.

In a specific embodiment of the instant invention an acetone solution containing pyrrolidone carboxylic acid and impurities such as tyrosine, leucine, and sulfuric acid or hydrochloric acid which are present in acid-hydrolyzed proteinaceous compositions is contacted with a primary basic anion exchange resin. The resin retains the pyrrolidone carboxylic acid as well as any sulfuric acid, tyrosine, and leucine present in the original crude mixture. When the anion exchange material is eluted with an aqueous solution, the eluate comprises pyrrolidone carboxylic acid, tyrosine, and leucine. The aqueous eluate is contacted with a secondary basic anion exchange resin which retains the pyrrolidone carboxylic acid, while the tyrosine, and leucine are not sorbed. When the anion exchange resin is treated with water, only the pyrrolidone carboxylic acid is retained while any residual tyrosine and leucine are washed out. The pyrrolidone carboxylic acid can then be removed from the anion exchange resin with an appropriate eluting agent, such as an aqueous sodium hydroxide solution.

In the past aqueous mediums have been employed in ion exchange purification processes. Based upon the behavior of aqueous solutions containing pyrrolidone carboxylic acid, sulfuric acid, tyrosine and leucine when contacted with an anion exchange resin, it would be expected that the sulfuric acid and the pyrrolidone carboxylic acid would be retained on the resin and the tyrosine and leucine would be present in the effluent. However, when an organic solvent such as acetone is used as the medium, the pyrrolidone carboxylic acid, sulfuric acid, tyrosine and leucine all are retained on the resin and when the resin is treated with water, only the sulfuric acid is retained on the resin while the pyrrolidone carboxylic acid, tyrosine and leucine are present in the eluate. When the resulting aqueous eluate is then contacted with a secondary basic anion exchanger, only the pyrrolidone carboxylic acid is retained on the resin and is recovered from the secondary anion exchange material.

A pyrrolidone carboxylic acid mixture, obtained for example, by converting the glutamic acid content of a protein hydrolysate to pyrrolidone carboxylic acid by heating (U. S. Patent No. 2,454,715) is treated with an organic solvent. Any low boiling monohydric alcohol, such as ethyl alcohol, methyl alcohol, isopropyl alcohol, butanol and the like, or low boiling aliphatic ketone such as acetone, methyl ethyl ketone, and the like, may be employed as the organic solvent in practicing the instant process. The low boiling solvents should contain four or less carbon atoms per molecule.

In the practice of one embodiment of the instant invention, aqueous acetone is a preferred solvent for the extraction of the pyrrolidone carboxylic acid from the raw materials because of its solubility characteristics; that is, the solubility of pyrrolidone carboxylic acid in aqueous acetone is relatively high, and the solubility of the other amino acids and the nonglutamic acid nitrogenous constituents, as well as the inorganic salts usually present in the crude mixtures of the raw materials is relatively low. Above about 90% of the glutamic acid originally present in the crude hydrolysates can be extracted in the form of pyrrolidone carboxylic acid, and about 90% of the total nonglutamic acid nitrogenous impurities, as well as substantial amounts of inorganic salts, are separated from the pyrrolidone carboxylic acid by this acetone extraction. The amount of acetone required to extract substantially all of the pyrrolidone carboxylic acid from the crude mixture varies, depending upon the type of raw material employed. For example, less acetone is required to substantially completely extract pyrrolidone carboxylic acid from hydrolysates having a relatively low content of tyrosine and leucine than is required for those having a higher content of these impurities. The extracting solution may be an acetone-water mixture containing between about 3% and about 35% water. When high selectivity in dissolving pyrrolidone carboxylic acid is desired, the extracting solution should contain only a small percentage of water. The total amount of PC extracted however, increases as the percentage of water present increases. An extracting solution containing about 90% acetone is preferred.

The organic solvent such as acetone is added to the crude mixture containing pyrrolidone carboxylic acid in sufficient amounts to extract the pyrrolidone carboxylic acid from the crude mixture. In addition to the pyrrolidone carboxylic acid, the resulting acetone extract usually contains some sulfuric acid or hydrochloric acid, tyrosine, leucine, inorganic salts, and traces of ammonia. The acetone extract is then contacted with a suitable primary basic anion exchange material which sorbs substantially all of the pyrrolidone carboxylic acid, sulfuric acid and tyrosine and leucine if they are present in the crude mixture. Pyrrolidone carboxylic acid, tyrosine, and leucine are eluted from the primary anion exchange material by washing with water. The aqueous eluate is treated with a secondary basic anion exchange material. The secondary anion exchanger may contain the same basic anion exchange resin as used in the primary anion exchanger or, if desired, a different anion exchange resin may be employed in the secondary exchanger. The pyrrolidone carboxylic acid is sorbed on the secondary anion exchange material, and the tyrosine and the leucine are not sorbed by the secondary anion exchange material. The pyrrolidone carboxylic acid by itself, is eluted from the secondary anion exchange material, for example, with aqueous sodium hydroxide. If desired, the resulting eluate containing purified pyrrolidone carboxylic acid can be subjected to hydrolysis by means of conventionally used inorganic acids or bases to produce glutamic acid.

The instant novel process for the recovery of pyrrolidone carboxylic acid may be carried out employing, as feed material, any mixture containing pyrrolidone carboxylic acid. When raw materials containing glutamic acid precursors such as corn gluten, wheat gluten, or similar proteinaceous materials are the source of the pyrrolidone carboxylic acid, these raw materials are subjected to hydrolysis with sulfuric acid or with hydrochloric acid by a conventional process such as those described in U. S. 2,405,223 and 2,505,129 in order to convert glutamic acid precursors present in the raw material to glutamic acid. The glutamic acid present in the hydrolysate can be substantially completely converted to pyrrolidone carboxylic acid by methods such as are described and claimed in copending application, Serial No. 258,103, filed on November 24, 1951, or any other suitable method may be employed.

In practicing a preferred embodiment of the instant novel process, an acetone extract is prepared by extracting a protein hydrolysate, the glutamic acid content of which has previously been converted to pyrrolidone carboxylic acid by conventional means, with an acetone-water mixture containing about 90% acetone. The acetone extract is contacted with an anion exchange resin such as Amberlite IR–45, and pyrrolidone carboxylic acid, tryosine, leucine, and hydrolyzing acid (H₂SO₄) are sorbed on resin. When the resin becomes exhausted it is washed with water, and pyrrolidone carboxylic acid, tyrosine, and leucine are present in the eluate. The aqueous eluate is contacted with additional Amberlite IR–45 anion exchange resin. In this step only the pyrrolidone carboxylic acid is retained on the resin. The pyrrolidone carboxylic acid is eluted from the resin with an acid such as hydrochloric acid, or with an alkali such as sodium hydroxide. If desired, the pyrrolidone carboxylic acid in the resulting eluate may be hydrolyzed, and glutamic acid recovered from the hydrolysate by concentrating and adjusting the pH of the hydrolysate to about 3.2 and separating the glutamic acid crystals therefrom.

Any basic anion exchange material may be employed in practicing the instant novel process as the primary and the secondary anion exchangers; however, a weakly basic anion exchange material is preferred. Suitable anion resins which may be employed but to which the invention is not limited are Amberlite IR–45, which is a weakly basic polyamine anion resin and which is preferred exchange material and Duolite A–2, Duolite A–5, Ionac A–300 and Amberlite IR–45. Although the exact composition of the above resins is unknown, it is believed that most of them fall in the following categories: phenol-formaldehyde resins containing either polyamines, aromatic polyamines or both, and/or possibly containing basic guanidino radicals.

If a packed column of the ion exchange resin is to be employed, prior to contacting the acetone extract with the resin packed in the column, the resin is treated with acetone in order to allow for swelling of the resin due to this solvent so that the column will not plug. Before passing the aqueous eluate from the primary resin through the packed column of the secondary ion exchange resin, the resin is treated with water to allow for swelling of the resin when in contact with water. The same basic anion exchange resin may be used in both columns; however, if desired, the second column may contain a different anion exchange resin than that contained in the primary column.

By applying the instant novel process to the recovery of glutamic acid equivalents from raw materials containing glutamic acid or its precursor compounds, the per cent recovery is increased as compared with the usual recovery methods; particularly in the case of proteinaceous raw materials, such as corn gluten which contains but limited quantities of glutamic acid. The processing of corn gluten by conventional isoelectric crystallization methods ordinarily results in a recovery of glutamic acid of about 60%, and for this reason it has not been considered a profitable commercial operation. When corn gluten is processed as herein described and the purified pyrrolidone carboxylic acid product is rehydrolyzed to glutamic acid, the recovery of glutamic acid averages approximately 85%.

The following example is presented in order to afford a clearer understanding of the practice of the instant invention, but it is to be distinctly understood that this example is illustrative only, and that there is no intention to limit the invention thereto.

*Example I*

A gluten hydrolysate was prepared by refluxing Maco corn gluten for about six hours with about twice its weight of 50% sulfuric acid. The glutamic acid-containing hydrolysate was neutralized to a pH of about 7.0 with ammonia, and humin was removed from the mixture by filtration. The filtrate, which contained about 13.9% glutamic acid, was refluxed for about 16 hours in the presence of reduced iron powder in the amount of about 40% of the weight of the gluten present in order to convert glutamic acid to pyrrolidone carboxylic acid. The resulting pyrrolidone carboxylic acid-containing mixture was filtered to remove iron, and concentrated in vacuo to about three times the weight of the starting gluten. To an aliquot of the pyrrolidone carboxylic acid-containing mixture, which was equivalent to about 20 grams of starting gluten, was added about 280 milliliters of extracting solution containing about 90% acetone, about 10% water, and a sufficient quantity of sulfuric acid to reduce the pH to about 1.5. Solid material was separated from the resulting mixture by filtration. The pyrrolidone carboxylic acid-containing extract was passed through a column of Amberlite IR–45 primary resin at a rate of between about 3 and about 4 milliliters per minute. The resin had been conditioned with acetone to allow for expansion.

The column used was about 15 milliliters in length and had a diameter of about three-eighths inch. The volume of resin was about 25 milliliters. Pyrrolidone carboxylic acid, tyrosine and leucine which were sorbed on the primary resin were eluted from the resin with water while the sulfuric acid was retained therein. The aqueous eluate was then passed through a secondary column of Amberlite IR-45 resin which had been conditioned with water. The pyrrolidone carboxylic acid was sorbed on the resin, and the tyrosine and leucine passed through the column in the effluent. The pyrrolidone carboxylic acid retained on the secondary anion exchange resin was removed by eluting with 4% aqueous sodium hydroxide solution.

Having thus fully described and illustrated the character of the instant invention, what is desired to be secured by Letters Patent is:

1. A process for preparing purified pyrrolidone carboxylic acid which comprises preparing a composition comprising water, acetone, and pyrrolidone carboxylic acid in which the ratio of water to acetone is between about 3:97 and about 35:65 and separating the acetone phase containing pyrrolidone carboxylic acid from the remaining phase of the composition.

2. A process of preparing a purified pyrrolidone carboxylic acid concentrate which comprises preparing a composition comprising water, acetone, and pyrrolidone carboxylic acid in which the ratio of water to acetone is between about 3:97 and about 35:65, separating the acetone phase containing pyrrolidone carboxylic acid from the remaining phase of the composition, contacting the acetone phase with a basic anion exchange resin, and eluting the pyrrolidone carboxylic acid from the resin.

3. A process for preparing purified pyrrolidone carboxylic acid which comprises preparing a composition comprising water, acetone, and pyrrolidone carboxylic acid, the water-acetone portion being about 10% water and about 90% acetone and separating the acetone phase containing pyrrolidone carboxylic acid from the remaining phase of the composition.

4. The process of claim 3 in which the acetone phase containing pyrrolidone carboxylic acid is extracted with a basic anion exchange resin, the resin is eluted with water and the resulting aqueous eluate is contacted with a basic anion exchange resin, following which pyrrolidone carboxylic acid is eluted from the last mentioned resin.

5. A process of preparing a purified pyrrolidone carboxylic acid concentrate which comprises preparing a composition comprising water, acetone, and pyrrolidone carboxylic acid, in which the ratio of water to acetone is between about 3:97 and about 35:65, separating the acetone phase containing pyrrolidone carboxylic acid from the remaining phase of the composition, contacting the acetone phase with a weakly basic anion exchange resin, and eluting the pyrrolidone carboxylic acid from the resin with water.

6. The process of claim 4 in which the basic anion exchange resin utilized is a weakly basic anion exchange resin.

7. The process of claim 4 in which the liquid portion of the composition comprising water, acetone, and pyrrolidone carboxylic acid contains about 10% water and about 90% acetone.

8. In a process for producing a purified pyrrolidone carboxylic acid concentrate by the acid hydrolysis of proteinaceous material and wherein humin is separated from the resulting hydrolysate and the glutamic acid therein is converted to pyrrolidone carboxylic acid, the improvements comprising adding a sufficient amount of an acetone-water mixture containing about 10% water to the pyrrolidone carboxylic acid-containing hydrolysate to extract pyrrolidone carboxylic acid therefrom, separating solid material from the pyrrolidone carboxylic acid-containing acetone extract, contacting the extract with a weakly basic anion exchange resin, eluting the resin with water, contacting the resulting aqueous eluate with weakly basic anion exchange resin, and eluting the pyrrolidone carboxylic acid from the last mentioned resin.

References Cited in the file of this patent

UNITED STATES PATENTS

| | | |
|---|---|---|
| 2,341,907 | Cheetham | Apr. 9, 1941 |
| 2,434,715 | Olcott et al. | Jan. 20, 1948 |
| 2,510,980 | Jacobs et al. | June 13, 1950 |
| 2,528,047 | Fitch et al. | Oct. 31, 1950 |
| 2,590,209 | Roberts | Mar. 23, 1952 |